Oct. 5, 1948.　　　R. G. FLOWERS ET AL　　　2,450,650
ELECTRIC CAPACITOR
Filed Dec. 13, 1945
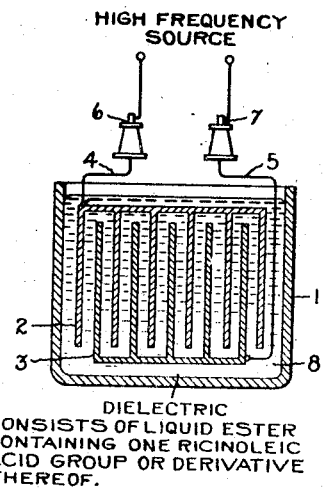
DIELECTRIC
CONSISTS OF LIQUID ESTER
CONTAINING ONE RICINOLEIC
ACID GROUP OR DERIVATIVE
THEREOF.
Inventors:
Ralph G. Flowers,
Leola Wills Flowers,
by Harry E. Dunham
Their Attorney.

Patented Oct. 5, 1948

2,450,650

UNITED STATES PATENT OFFICE 2,450,650

ELECTRIC CAPACITOR

Ralph G. Flowers and Leola Wills Flowers, Pittsfield, Mass., assignors to General Electric Company, a corporation of New York Application December 13, 1945, Serial No. 634,699

1 Claim. (Cl. 175—41)

The present invention relates to electric capacitors which are adapted to operate in the high frequency field, that is, in the field of frequencies at least as high as about 100 kilocycles and commonly as high as 1000 kilocycles. Our invention comprises new and improved dielectric materials for use in such capacitors consisting of liquid monoesters of ricinoleic acid and its derivatives, including 12-hydroxy stearic acid and also the acyl derivatives of such acids.

Liquid esters of acyl derivatives of ricinoleic acid, such for example as acetyl and propionyl ricinoleate monesters, are included among the preferred forms of dielectric materials which embody our invention.

The accompanying drawing illustrates conventionally a type of electric capacitor containing a dielectric material embodying our invention.

Although in the course of years of research and development a number of efficient liquid dielectric materials have been provided for operation in capacitors in the low frequency field, including frequencies of the order of 25 to 60 cycles, it has been found that such dielectric materials are not adapted for use in the high frequency field.

We have discovered that liquid monoesters, that is, esters containing only one ricinoleic acid group or derivative, function effectively in high frequency capacitors with desirable capacity characteristic and low energy losses. Such materials have been found to be less active chemically and less susceptible to contamination than dielectric materials heretofore used in high frequency capacitors.

A type of spaced plate capacitor to which our invention is applicable is shown in vertical section in the accompanying drawing.

The capacitor here shown comprises a container or tank 1 in which are disposed juxtaposed armature plates 2, 3 which are connected by conductors 4, 5 to suitable terminals 6, 7. The capacitor plates 2, 3 of the drawing may consist of aluminum, tinned copper or tinned copper alloy. The drawing is intended to represent symbolically capacitor plates which may be stationary or relatively movable with respect to one another.

The armature plates are immersed in a normally liquid dielectric material 8 which consists of a monoester of ricinoleic acid or of a suitable derivative thereof. Examples of esters of ricinoleic acid suitable for dielectric purposes are ethylene glycol monomethyl ether ricinoleate (methyl cellosolve ricinoleate), ethylene glycol monomethyl ether acetyl ricinoleate (methyl cellosolve acetyl ricinoleate), diethylene glycol monoethyl ether acetyl ricinoleate (ethyl carbitol acetyl ricinoleate), ethylene glycol monomethyl ether propionyl ricinoleate (methyl cellosolve propionyl ricinoleate) and ethylene glycol monobenzyl ether acetyl ricinoleate. An example of a monoester of an acid which may be considered as being ricinoleic acid in which the double bond has been saturated with hydrogen is ethyl 12-acetoxy stearate. Other examples of esters of 12-hydroxy stearic acid suitable for high frequency dielectric purposes are ethylene glycol monoethyl ether 12-acetoxy stearate, ethylene glycol monoethyl ether 12-propionoxy stearate, ethyl 12-propionoxy stearate, and ethylene glycol monobenzyl ether 12-acetoxy stearate.

The alcohol component of dielectric esters embodying our invention may be aliphatic or arylaliphatic alcohols, for example, methyl, ethyl, propyl, butyl alcohols, ethylene glycol monoethyl ether, diethylene glycol monomethyl ether, ethylene glycol monoethyl ether and diethylene glycol monobenzyl ether. In general the alcohol when esterified with one of the acid groups above indicated should result in a normally liquid material. Liquid monoesters of ricinoleic or hydroxy stearic acid in which the hydrogen of the hydroxy group is replaced by an acyl group are adapted for the purposes of our invention. The chemical formula of esters included as dielectrics of our invention may be represented as:

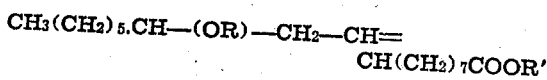

the double bond being unsaturated or saturated with hydrogen. R represents an acyl radicle or hydrogen and R' represents an aliphatic or arylaliphatic radicle.

Ethylene glycol monomethyl ether acetyl ricinoleate (methyl cellosolve acetyl ricinoleate) is an oily material having at 660 kilocycles a dielectric constant of 4.2, at 70° C. a power factor of .086 per cent and a dielectric strength of 260 volts/mil using a 50 mil gap at 650 kilocycles. At one megacycle this material has a power factor of .11 per cent and at 3.5 megacycles a power factor of .21%. Ethylene glycol monomethyl ether propionyl ricinoleate at 660 kilocycles has a dielectric constant of 4.5 and a power factor of 0.09 per cent.

Other examples of liquid dielectric materials which are suitable for the high frequency field are the following:

Ethyl 12-acetoxy stearate has .12 per cent power factor and dielectric constant of 3.9 at one megacycle. Its insulation resistance at 25° C. is $1.38 \times 10^{11}$ ohms per centimeter.

Ethyl 12-propionoxy stearate has .105 per cent power factor and dielectric constant of 3.8 at one megacycle. Its insulation resistance at 25° C. is $1.22 \times 10^{11}$ ohms per centimeter.

Ethylene glycol monoethyl ether 12-acetoxy stearate has .095 per cent power factor and dielectric constant of 3.9 at one megacycle. Its insulation resistance is .93 at $10^{11}$ ohms per centimeter at 25° C.

Ethylene glycol monoethyl ether 12-propionoxy stearate has .17 per cent power factor and dielectric constant of 4.0 at one megacycle. Its insulation resistance is .93 at $10^{11}$ ohms per centimeter at 25° C.

Ethylene glycol monobenzyl ether 12-acetoxy stearate, ethylene glycol monobenzyl ether acetyl ricinoleate and ethylene glycol monobenzyl ether propionyl ricinoleate also are examples of liquid dielectric materials suitable for the high frequency field.

The resistivity and power factors of high frequency dielectric embodying our invention remain substantially unchanged after long periods of operation at 100° C. as well as at lower temperatures, thereby indicating that such materials are not readily susceptible to contamination. It has been found necessary heretofore to refine high frequency liquid dielectric until an extremely high resistivity is obtained and to maintain such high state of purity in order to obtain satisfactory service as a dielectric element in capacitors. The materials embodied in our invention have given excellent service in capacitors when the resistivity is only a small fraction of that required for the present liquid dielectrics. A resistivity of about $67 \times 10^9$ ohms/cm.$^3$ has been found to be satisfactory.

What we claim as new and desire to secure by Letters Patent of the United States is:

An electric capacitor comprising the combination of a container, spaced cooperating armatures therein, and a dielectric material consisting of ethylene glycol monomethyl ether acetyl ricinoleate.

RALPH G. FLOWERS.
LEOLA WILLS FLOWERS.

REFERENCES CITED

The following references are of record in the file of this patent:

UNITED STATES PATENTS

| Number | Name | Date |
|---|---|---|
| 1,955,021 | Rider | Apr. 17, 1934 |

FOREIGN PATENTS

| Number | Country | Date |
|---|---|---|
| 119,404 | Australia | Jan. 4, 1945 |